(12) United States Patent
Eisenkraemer et al.

(10) Patent No.: US 7,450,302 B2
(45) Date of Patent: Nov. 11, 2008

(54) MICROSCOPE WITH IMAGE BRIGHTNESS EQUALIZATION

(75) Inventors: Frank Eisenkraemer, Biebertal (DE); Ralf Krueger, Butzbach/Griedel (DE); Christian Schulz, Wetzlar-Naunheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 79 days.

(21) Appl. No.: 11/160,789

(22) Filed: Jul. 8, 2005

(65) Prior Publication Data

US 2006/0012857 A1    Jan. 19, 2006

(30) Foreign Application Priority Data

Jul. 14, 2004    (DE)    ........... 10 2004 033 967

(51) Int. Cl.
*G02B 21/06*    (2006.01)
(52) U.S. Cl. ........................ 359/385; 359/381
(58) Field of Classification Search ........... 359/368, 359/384, 388, 381, 385, 370
See application file for complete search history.

(56) References Cited

U.S. PATENT DOCUMENTS

| | | | |
|---|---|---|---|
| 3,781,089 A * | 12/1973 | Fay et al. ............... | 359/587 |
| 4,714,823 A | 12/1987 | Spruck et al. ........... | 250/205 |
| 5,046,834 A | 9/1991 | Dietrich ................. | 350/520 |
| 6,627,304 B1 * | 9/2003 | Eisenkramer ........... | 428/216 |
| 2004/0252380 A1 * | 12/2004 | Kashima ................ | 359/656 |
| 2006/0018050 A1 * | 1/2006 | Okami et al. ........... | 359/888 |

FOREIGN PATENT DOCUMENTS

| | | |
|---|---|---|
| DE | 3221804 | 12/1983 |
| DE | 3918990 | 12/1990 |
| JP | 10-227979 | 8/1998 |

* cited by examiner

*Primary Examiner*—Joshua L Pritchett
(74) *Attorney, Agent, or Firm*—Simpson & Simpson, PLLC

(57) ABSTRACT

A microscope (10) is disclosed, having a revolving nosepiece (12) on which are mounted multiple objectives. The objectives (11) comprise multiple components $21_1, \ldots 21_n$). A light-intensity-reducing layer (40) is applied onto at least one component of an objective. The light-intensity-reducing layer (40) is configured in such a way that for each objective introduced into the illumination beam path, the brightness behind it is of the same magnitude.

13 Claims, 4 Drawing Sheets

MICROSCOPE WITH IMAGE BRIGHTNESS EQUALIZATION

CROSS REFERENCE TO RELATED APPLICATIONS

This patent claims priority of German patent application 10 2004 033 967.8, filed Jul. 14, 2004, which is incorporated by reference herein.

FIELD OF THE INVENTION

The present invention concerns a microscope with image brightness equalization. The invention concerns in particular a microscope having a revolving nosepiece on which are mounted multiple objectives, each of which possesses an exit pupil. The objectives comprise multiple components. The microscope is also equipped with an illumination device that emits light into an illumination beam path and image beam path.

BACKGROUND OF THE INVENTION

German Unexamined Application DE 39 18 990 also discloses a microscope with image brightness equalization. In a microscope, neutral density filters adapted to the objectives are introduced in the image beam path of the respective objective in the objective nosepiece, thereby achieving an image brightness equalization upon switching of the objectives. The neutral density filters are arranged on sliders, and can easily be removed from the objective nosepiece. It is disadvantageous that the neutral density filters are arranged on separate sliders, since they might easily be mislaid and/or be incorrectly inserted into the nosepiece.

German Unexamined Application DE 32 21 804 A1 discloses an illumination device for optical close viewing devices. In order to simplify handling for the viewer, provision is made for automatic brightness control as a function of the magnification that is selected. Various lenses with different magnifications can be introduced into the beam path of the illumination device, and brightness adaptation is brought about by way of a mask that has different openings. Depending on the magnification of the lens, a corresponding opening in the lens is introduced into the beam path in order thereby to achieve an adaptation of the brightness of the illumination device. The disadvantage of this apparatus is that further mechanical means must be provided in order to achieve synchronous switching between the lens and the mask opening.

U.S. Pat. No. 4,714,823 discloses an apparatus for determining the brightness in the image beam path of a microscope. A sensor is provided that determines the brightness in the image beam path of the microscope and delivers corresponding actuating signals to a lamp control system so that, for example, when an objective change is made the user is not surprised by excessively bright illumination in the image beam path. This apparatus once again, logically, requires further control means in order to adapt or control the brightness in the image beam path of a microscope. The design here cannot be described as simple.

BRIEF SUMMARY OF THE INVENTION

It is therefore the object of the present invention to create a microscope with which, in simple and reliable fashion, an image brightness equalization can be effected when objectives are changed.

The aforesaid object is achieved by a microscope comprising: a revolving nosepiece on which several objectives are mounted, wherein each of which possesses an exit pupil and the objectives encompass multiple components; an illumination device that emits light into an illumination beam path and image beam path of the microscope, and a light-intensity-reducing layer is applied onto at least one component of an objective, wherein the layer is configured in such a way that for each objective introduced into the illumination beam path, the brightness after the exit pupil is of the substantially identical magnitude.

What has been recognized according to the present invention is that a light-intensity-reducing layer is applied onto a component of at least one microscope objective. This layer is to be configured in such a way that for each objective introduced into the illumination beam path, the brightness behind it is of the same magnitude.

A component of the objective can be, for example, at least one lens. A further component of an objective can be, for example, a cement layer between two lenses. The component of the objective can likewise be a plane-parallel plate. It is advantageous if the light-intensity-reducing layer is applied onto the component of the objective that is arranged in the vicinity of the exit pupil of the objective. The light-intensity-reducing layer on the component advantageously has a residual reflection of less than 3%. The light-intensity-reducing layer possesses a spherical shape which is configured in such a way that first-order reflections are coupled out of the illumination beam path of the microscope.

For most applications, especially in pathology, it is advantageous if a 4× and a 10× objective are mounted on the revolving nosepiece as low-magnification objectives, and if a 40× objective is provided for detailed examination. These objectives are adapted in such a way that for each objective introduced into the illumination beam path, the brightness behind it is of the same magnitude.

The light-intensity-reducing layer is a layer system made up of multiple layers, the layer system having a total thickness of 387 nm and exhibiting a thickness variation of +/−10%. The layer system is made up of seven layers. The first layer is made of a medium-refraction material, the second layer of a metallic material, the third layer of a medium-refraction material, the fourth layer of a metallic material, the fifth layer of a medium-refraction material, the sixth layer of a metallic material, and the seventh layer of a high-refraction material. The refractive index of the medium-refraction material is approximately 1.68. The layers made of the metallic material are made of chromium or nickel. The layers made of the high-refraction material have a refractive index of approximately 2.0.

BRIEF DESCRIPTION OF THE DRAWINGS

In conjunction with the explanation of the preferred exemplifying embodiments of the invention and with reference to the drawings, generally preferred embodiments and refinements of the teaching will also be explained. In the drawings.

DETAILED DESCRIPTION OF THE INVENTION

Figure 1:
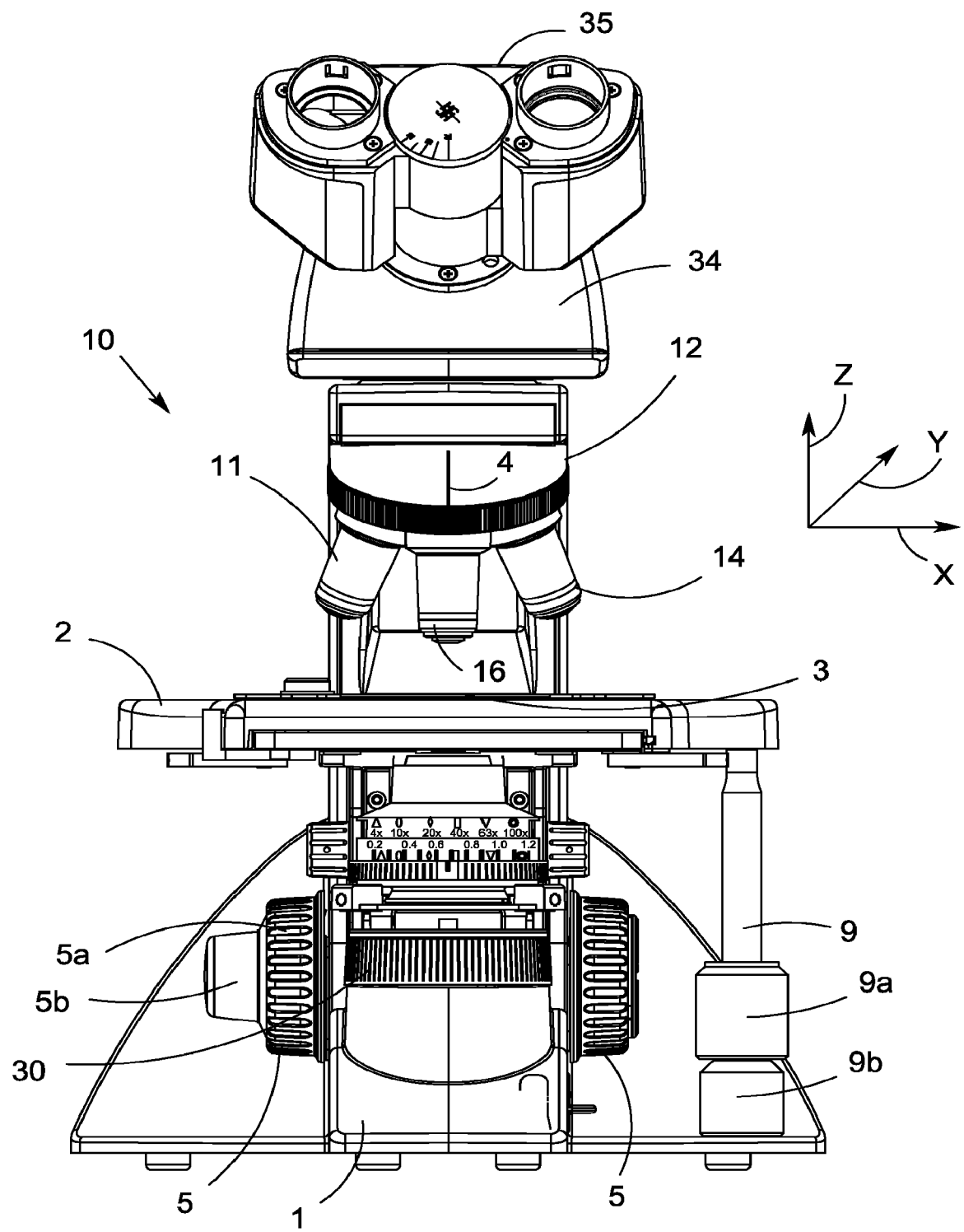
FIG. 1 is a frontal view of the microscope in which the teaching of the present invention is implemented.

FIG. 1 is a frontal view of microscope 10 in which the teaching of the present invention is implemented. Microscope 10 encompasses a stand 1 on which a microscope stand 2 is mounted. A condenser 30 is provided beneath microscope stand 2. A revolving nosepiece 12 is mounted on stand 1 opposite condenser 30. Revolving nosepiece 12 carries multiple objectives 11, 14, 16 that can be respectively introduced by a user into a working position 4. The working position is that position of an objective 11, 14, 16 in which a user can perform a microscopic examination of a specimen 3 located on microscope stage 2. As depicted in FIG. 1, objective 16 is in working position 4.

Microscope stage 2 is provided with an adjustment element 9 with which microscope stage 2 can be displaced in an X direction and a Y direction. Adjusting element 9 possesses for that purpose an X adjustment element 9a and a Y adjustment element 9b. Microscope 10 likewise encompasses an adjustment device 5 for the Z direction, with which microscope stage 2 is moved in the Z direction. The adjustment device encompasses at least one first and one second actuation element 5a and 5b, each of which encompasses a fine drive and a coarse drive. Microscope 10 furthermore carries a tube 34 that is provided with a binocular eyepiece 35.

Figure 2:
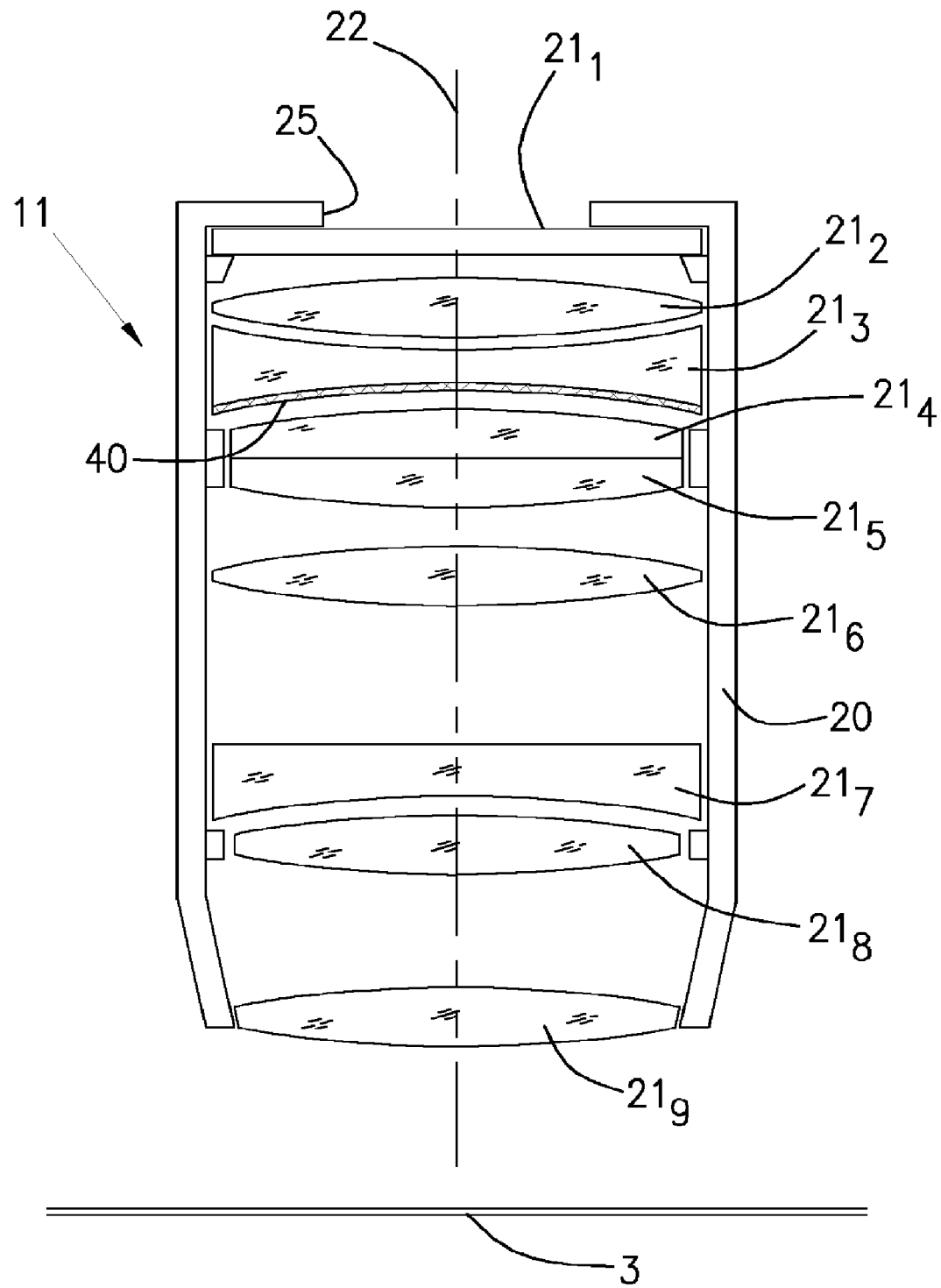
FIG. 2 is a schematic sectional view of an objective.

FIG. 2 is a schematic cross section through an objective that is used in microscopes. Objective 11 possesses a casing 20 that encloses the various components $21_1, 21_2, 21_3, \ldots, 21_n$ of objective 11. It is self-evident that the number of optical components of objective 11 depicted in FIG. 2 is in absolutely no way to be construed as a limitation of the invention. It is self-evident that the idea of the present invention can be used irrespective of the number of optical components present in an objective. The optical components of the objective are arranged symmetrically about an optical axis 22. An exit pupil 25 is provided at the end of objective 11 facing away from specimen 3. A light-intensity-reducing layer 40 can then be provided on one of the optical components of objective 11. As depicted in FIG. 2, this layer is provided, for example, on optical component $21_3$.

Figure 3:
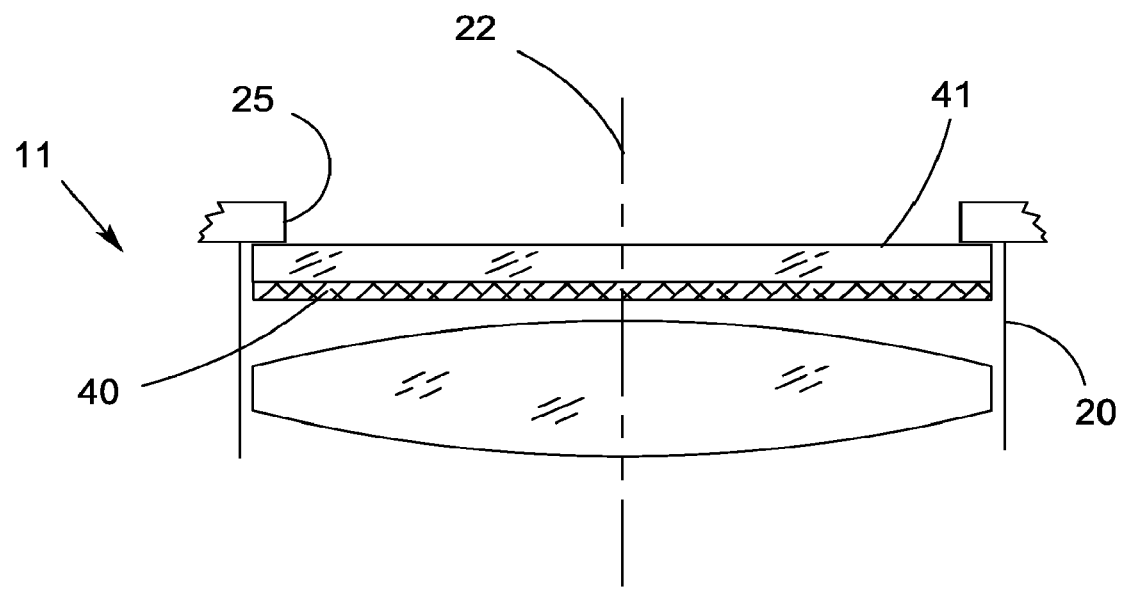
FIG. 3 is a schematic partial view of a section through an objective of a microscope; in this embodiment, the layer system is applied onto a plane-parallel plate.

FIG. 3 is a schematic partial view of objective 11 in the region around exit pupil 25. A plane-parallel plate 41 is placed after exit pupil 25 as the first optical component. Light-reducing layer 40 is applied onto plane-parallel plate 41.

Figure 4:
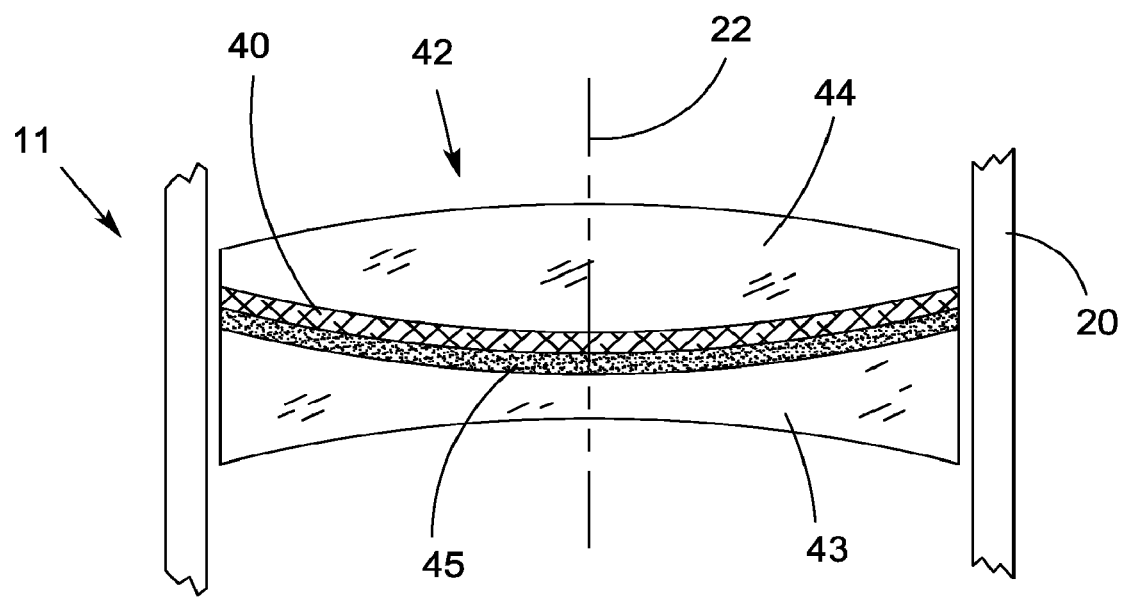
FIG. 4 is a schematic partial view of the objective, in which the layer system is arranged between a lens doublet.

FIG. 4 schematically shows a further embodiment of the invention. In this case the optical component comprises a lens doublet 42 that encompasses a concave lens 43 and a convex lens 44. The two lenses 43 and 44 are immovably joined to one another via a cement layer 45. In this embodiment, light-intensity-reducing layer 40 is applied onto a lens 43 or 44 in such a way that it ends up between cement layer 45 and one of lenses 43 or 44.

Figure 5:
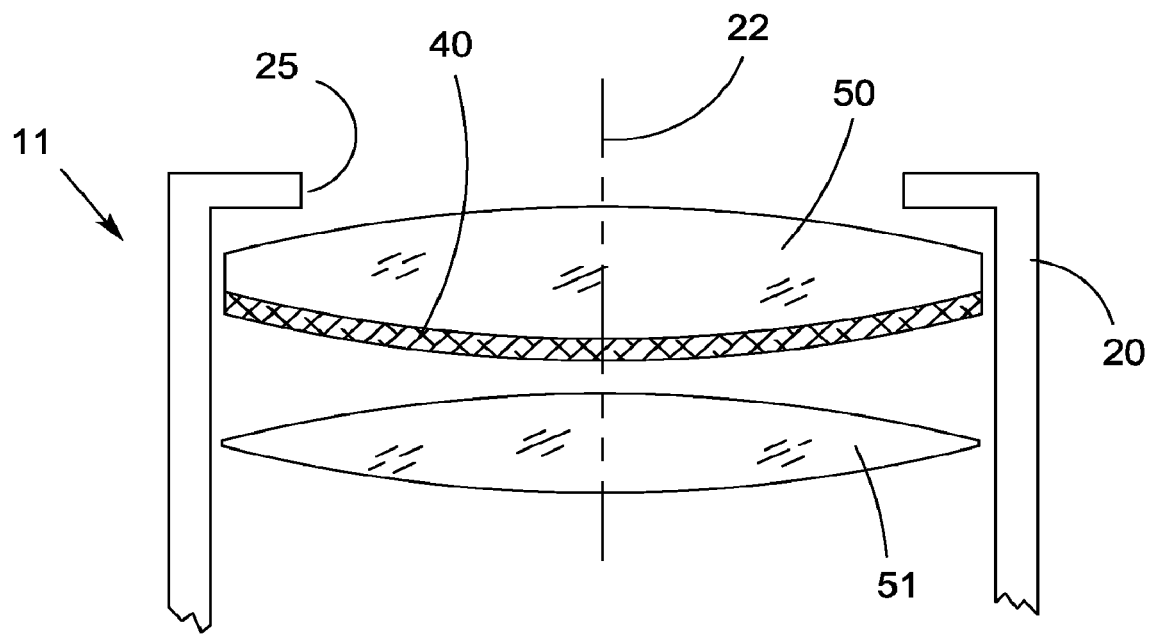
FIG. 5 is a schematic partial view of the objective, in which the layer system is applied onto a lens; and, FIG. 6 schematically depicts the layer structure of the layer system.

FIG. 5 schematically shows a further embodiment of the invention. Light-intensity-reducing layer 40 is provided on a lens 50 in the vicinity of exit pupil 25 of objective 11. Light-intensity-reducing layer 40 has a spherical shape which is configured in such a way that first-order residual reflections are coupled out of the illumination beam path of the microscope. Residual reflections that are produced by light-intensity-reducing layer 40 thus encounter casing 20 of objective 11 and are absorbed there. These residual reflections therefore no longer move in the direction of optical axis 22 of objective 11, and thus do not influence the optical image produced by the objective. Application of the light-intensity-reducing layer in the vicinity of exit pupil 25 of objective 11 is not an absolute necessity, since the attenuation theoretically functions at any point in the objective. The critical advantage of positioning light-intensity-reducing layer 40 in the vicinity of exit pupil 25, however, is that inhomogeneities or small defects in light-intensity-reducing layer 40 have the least effect on the resulting image. Attenuation for all apertures and image positions is, in addition, most uniform in the vicinity of the exit pupil.

Figure 6:
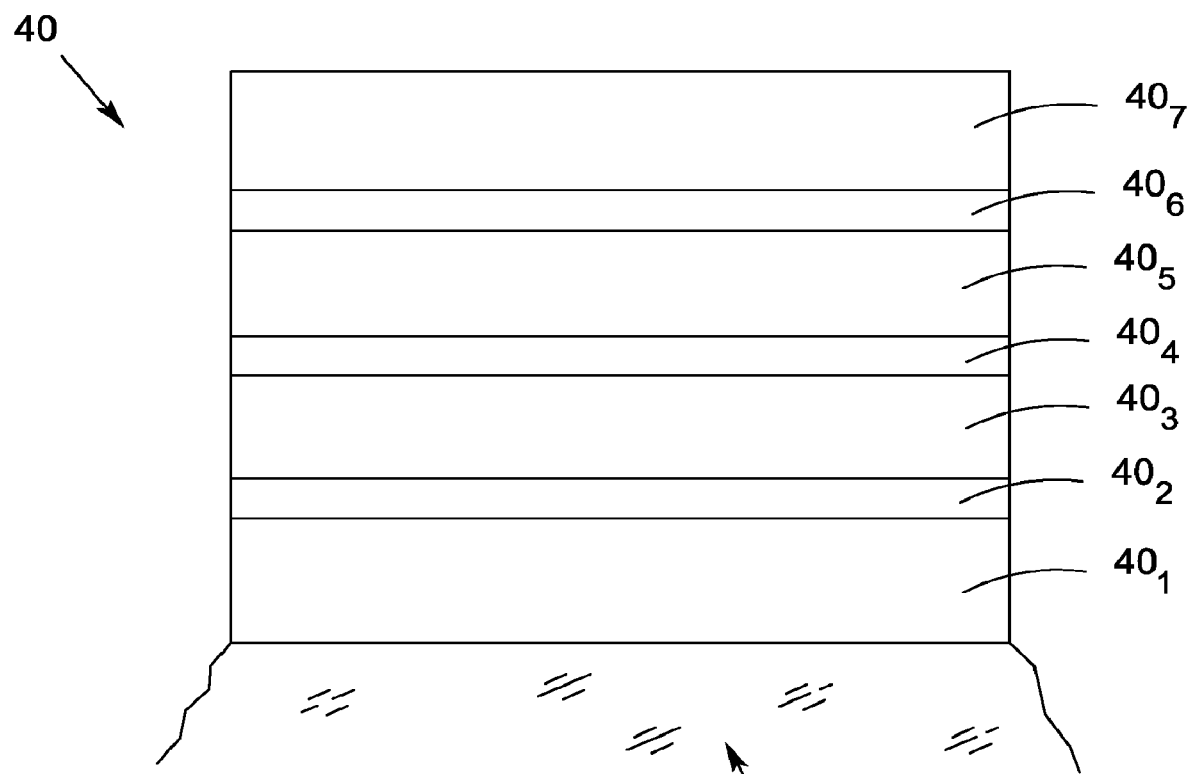

FIG. 6 schematically shows the construction of light-reducing layer 40. Light-reducing layer 40 is constructed from multiple layers $40_1, 40_2, 40_3, \ldots 40_n$. In the embodiment depicted here, light-reducing layer 40 comprises seven layers. The layers differ in terms of material selection and thickness. In the exemplifying embodiment depicted in FIG. 6, first layer $40_1$ is made of a medium-refraction material that is applied onto the optical component at a thickness of 134.6 nm. The medium-refraction material has a refractive index of approx. 1.68. Second layer $40_2$ is made of a metallic material, and is applied onto first layer $40_1$ at a thickness of 0.62 nm. The metallic material can be, for example, chromium or nickel. Third layer $40_3$ is once again made of a medium-refraction material that is applied onto second layer $40_2$ at a thickness of 68.36 nm. The medium-refraction material has a refractive index of 1.68. Fourth layer $40_4$ is once again a metallic material that is applied onto third layer $40_3$ at a thickness of 1.72 nm. The metallic material is, for example, chromium or nickel. Fifth layer $40_5$ is once again made of a medium-refraction material that is applied onto fourth layer $40_4$ at a thickness of 67.12 nm. The medium-refraction material has a refractive index of 1.68. Sixth layer $40_6$ is made of metallic material, and is applied onto fifth layer $40_5$ at a thickness of 1.63 nm. The metallic material is, for example, chromium or nickel. Seventh layer $40_7$ is made of a high-refraction material and is applied onto sixth layer $40_6$ at a thickness of 112.94 nm. The high-refraction material has a refractive index of 2.0. Seventh layer $40_7$ is followed by air or, as indicated in an exemplifying embodiment of the invention, optionally by a cement layer. The transmittance of light-reducing layer 40 must be adjusted so that the user receives the same brightness impression for the various objectives that are pivoted into the beam path of the microscope, and this should be independent of the selected magnification of the particular objective.

The attenuation can be calculated computationally from the ratio of the image-side apertures of the objectives squared, i.e., for example, the transmission of the 10× objective would be the nominal aperture of the 40× objective divided by the nominal aperture of the 10× objective, squared. In the case of the 40× objective, however, it is not the nominal aperture but only two-thirds of it that is used. The reason is that when the microscopes and objectives are utilized in pathology, the diaphragm is closed down to two-thirds in order to obtain a better contrast impression. In reality, however, deviations from this ideal situation are apparent, principally because of inhomogeneities in illumination. The correct transmittance of light-intensity reducing layer 40 was ascertained in a series of experiments on the microscopes. The invention is particularly relevant for use in pathology. The way in which a pathologist works is usually to look for structures of interest in a specimen using a low-magnification objective, and then to view them more closely using a detail objective. It is therefore absolutely necessary for no changes in the viewer's brightness impression to occur when switching from a low-magnification object to a detail objective. In pathology, the 4× objective and the 10× objective are those principally used as low-magnification objectives. A 40× objective is generally used as the detail objective. The user thus switches back and forth between the 40× and the 10× objective and the 40× objective. The 4× objective and 40× objective, and the 10× objective and 40× objective, must therefore be matched in terms of brightness; this is done by appropriate application of light-intensity-reducing layer 40. As already mentioned, light-intensity-reducing layer 40 is constructed from multiple layers, and possesses a total thickness of 387 nm with a variation of +/−10%.

In conclusion, be it noted very particularly that the exemplifying embodiments discussed above serve merely to describe the teaching claimed, but do not limit it to the exemplifying embodiments.

What is claimed is:

1. A microscope comprising: a revolving nosepiece on which several objectives are mounted, wherein each of which possesses an exit pupil and the objectives encompass multiple components; an illumination device that emits light into an illumination beam path and image beam path of the microscope, and a light-intensity-reducing layer is applied onto at least one component of an objective, wherein the layer is configured in such a way that for each objective introduced into the illumination beam path, the brightness after the exit pupil is of substantially identical magnitude, wherein a component of the multiple components is a lens doublet; and the light-intensity-reducing layer is provided between the two lenses of the doublet.

2. The microscope as defined in claim 1, wherein at least one component of the multiple components is at least one lens.

3. The microscope as defined in claim 1, wherein at least one component of the multiple components is at least one cement layer between two lenses.

4. The microscope as defined in claim 1, wherein a component of the multiple components is a plane-parallel plate.

5. The microscope as defined in claim 1, wherein the light-intensity-reducing layer is applied onto a component of the multiple components or the objective that is arranged in the vicinity of the exit pupil.

6. The microscope as defined in claim 1, wherein the light-intensity-reducing layer on a component of the multiple components has a residual reflection of less than 3%.

7. The microscope as defined in claim 1, wherein the light-intensity-reducing layer has a spherical shape which is configured in such a way that first-order residual reflections are coupled out of the illumination beam path of the microscope.

8. The microscope as defined in claim 1, wherein a 4× and a 10× objective are provided on the revolving nosepiece as low-magnification objectives, and a 40× objective is provided for detailed examination; and these objectives are adapted in such a way that for each objective introduced into the illumination beam path, the brightness after the exit pupil is of the same magnitude.

9. A microscope comprising: a revolving nosepiece on which several objectives are mounted, wherein each of which possesses an exit pupil and the objectives encompass multiple components; an illumination device that emits light into an illumination beam path and image beam path of the microscope, and a light-intensity-reducing layer is applied onto at least one component of an objective, wherein the layer is configured in such a way that for each objective introduced into the illumination beam path, the brightness after the exit pupil is of substantially identical magnitude, wherein the light-intensity-reducing layer is a layer system made up of multiple layers; and the layer system has a total layer thickness of 387 nm with a variation of +/−10%, and wherein the layer system is constructed from seven layers.

10. The microscope as defined in claim 9, wherein the first layer is made of a medium-refraction material, the second layer of a metallic material, the third layer of a medium-refraction material, the fourth layer of a metallic material, the fifth layer of a medium-refraction material, the sixth layer of a metallic material, and the seventh layer of a high-refraction material.

11. The microscope as defined in claim 10, wherein the layers made of the medium-refraction material have a refractive index of approximately 1.68.

12. The microscope as defined in claim 11, wherein the layers made of the metallic material are made of chromium or nickel.

13. The microscope as defined in claim 12, wherein the layers made of the high-refraction material have a refractive index of approximately 2.00.

\* \* \* \* \*